United States Patent [19]

Connors

[11] 4,256,367
[45] Mar. 17, 1981

[54] STEREOSCOPIC VIEWER - BOOKLET DEVICE

[76] Inventor: Robert G. Connors, Stagecoach Rd., Woodbury, Conn. 06798

[21] Appl. No.: 47,495

[22] Filed: Jun. 11, 1979

[51] Int. Cl.³ ............................................ G02B 27/22
[52] U.S. Cl. .................................... 350/135; 350/143
[58] Field of Search .................... 350/143, 133–135, 350/130–132, 136–142

[56] References Cited

U.S. PATENT DOCUMENTS

| | | | |
|---|---|---|---|
| 2,139,782 | 12/1938 | Van Albada | 350/135 |
| 3,473,870 | 10/1969 | Platt | 350/143 |
| 4,142,778 | 3/1979 | Lasky et al. | 350/135 |
| 4,146,303 | 3/1979 | Baba | 350/135 |

FOREIGN PATENT DOCUMENTS

| | | | |
|---|---|---|---|
| 760590 | 2/1934 | France | 350/134 |
| 453568 | 12/1949 | Italy | 350/135 |

*Primary Examiner*—Jon W. Henry
*Attorney, Agent, or Firm*—Lawrence Hager

[57] ABSTRACT

A stereoscopic viewer and booklet device for presenting information in two complimenting media, i.e., stereograms accompanied by a booklet containing relevant and interesting information pertaining thereto. The viewer utilizes a split 35mm film having pairs of stereoscopic spaced (corresponding picture) frames. Sprocket holes are provided at regular intervals along the film. The viewer includes a film guide channel having a film take-up archway, adapted to accommodate the film spacing between paired frames to thereby effect alignment of the paired frames with respective lenses of the stereoscope. A centrally disposed thumbwheel is manually actuated to rotate a sprocket wheel for advancing and rewinding the film laterally through the stereoscopic viewer. The sprocket wheel cooperates with the film take-up archway to provide multiple sprocket teeth engagement with the sprocket holes.

14 Claims, 5 Drawing Figures

STEREOSCOPIC VIEWER - BOOKLET DEVICE

BACKGROUND OF THE INVENTION

The invention relates generally to an improved stereoscopic viewing device. It is particularly directed to the provision of a stereoscopic viewer adapted for using a film strip containing spaced stereograms thereon in cooperation with an attached booklet.

Stereoscopic viewers are known which enable stereograms to be viewed. Typically, the viewer requires either the use of a pair of stereoscopic picture frames mounted or recorded on a film to have a fixed center-to-center spacing equal to a selected interocular distance such as in U.S. Pat. Nos. 2,807,191 issued Sept. 24, 1957 to Rolla T. Flora and 2,889,744 issued June 9, 1959 to Joseph L. Bonanno, or the use of mirror devices for reflecting juxtaposed paired stereoscopic picture frames to the viewing lenses such as in U.S. Pat. No. 4,026,636 issued May 31, 1977 to Giuliano Cecchini. A major disadvantage of these type devices is the associated cost of the film recording technique and/or the (mirror) image reflecting devices.

The following patents represent some of the prior art pertinent to the field of the present invention: U.S. Pat. Nos. 2,590,260 issued Mar. 25, 1952 to G. M. Mast et al; 2,643,577 issued June 30, 1953 to J. N. Williams; 2,573,543 issued Oct. 30, 1951 to J. C. Childs; 2,326,718 issued Aug. 10, 1943 to G. M. Mast; 2,122,649 issued July 5, 1938 to M. Kahn; and 2,667,810 issued Feb. 2, 1954 to J. F. Jaros. These prior art patents are merely typical of the art showing stereoscopic viewers and are not in any way intended to be an all inclusive list of the pertinent patents.

In contrast to the prior art, the present invention provides a stereoscopic viewer which enables the use of a film strip having a pair(s) of stereoscopically recorded spaced picture frames which are brought together to have a center-to-center interocular separation for alignment with the viewing lenses by means of a new and improved film drive and film take-up mechanism, is adapted for ease of use by the operator and involves a minimum of associated parts. A booklet can readily be attached to the viewer which, in written form, provides supplementary information relevant to the stereogram(s).

SUMMARY OF THE INVENTION

Generally speaking, in accordance with the invention, a stereoscopic viewer is provided which utilizes a film strip having at least one pair of stereoscopically recorded (spaced) picture frames which are effectively displaced to have a center-to-center interocular disposition by means of a film take-up device whereby said stereogram can be brought into registration with the viewing lenses of the viewer.

According to the preferred embodiment of the invention, a portable stereoscopic viewer is provided which utilizes a split 35 mm film strip. The film drive mechanism is adapted for ease of use by either a left or right handed operator with actuation of a centrally disposed manually operated actuator. The viewer is adapted for carriage of a booklet for being used in cooperation with the stereograms.

Accordingly, it is an object of the present invention to provide a stereoscopic viewer adapted for utilizing a film strip with spaced stereograms.

Another object of the invention is to provide a stereoscopic viewer having a curved or arcuate film guide channel which functions as a film takeup mechanism.

Another object of the invention is to provide a stereoscopic viewer having a new and improved film drive mechanism.

Another object of the invention is to provide a new and improved film drive and film take-up mechanism for a portable stereoscopic viewer to enable multiple sprocket teeth engagement with sprocket holes formed along an edge of a split 35 mm film.

Another object of the invention is to provide a new and improved stereoscopic viewer which substantially eliminates any design prejudice impedimental to its use by either left or right handed persons.

It is a further object of the invention to provide a new and improved portable educational and/or entertainment device which incorporates and integrates the presentation of information in two complimenting media, i.e., stereoscopic pictures with attached written information relative thereto.

Another object of the invention is to provide a leisure product, e.g., a tour guide or travelogue device, which incorporates stereoscopic pictures and relevant information in a small, lightweight and easy-to-use device adapted for being readily carried, e.g., in the pocket of an operator of the viewer.

Further advantages and objectives of the present invention will be apparent from the following detailed description of the preferred embodiment of the invention. Like reference numerals refer to like devices/functions throughout.

DESCRIPTION OF THE PREFERRED EMBODIMENT

Figure 5:
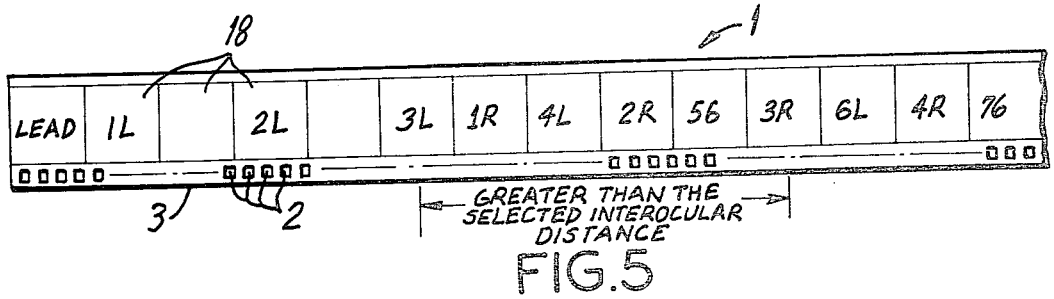
FIG. 5 is a plan view of a strip of photographic film illustrating an arrangement of stereograms on a split 35 mm film in accordance with the preferred embodiment of the present invention.

The film 1, FIG. 5, is preferably a strip of split 35 mm film, with standard perforations or sprocket holes 2 along its bottom edge 3. Techniques for longitudinally splitting standard 35 mm photographic film are well known in the field such as is described in U.S. Pat. No. 4,026,636 issued May 31, 1977 to Guiliano Cecchini and, therefore, will not be described in detail herein to avoid prolixity.

Each pair 1L-1R, 2L-2R, 3L-3R . . . of the stereoscopic picture frames are recorded on the film 1 with a longitudinal center-to-center separation greater than the selected interocular distance.

It should be recognized, however, that other film sizes such as 16 mm could also be depicted as alternative embodiments. And, in accordance with the invention, the term "stereoscopically recorded pictures or image" as used throughout the specification and claims refers to two corresponding-paired pictures or images for use in a stereoscope to give a three-dimensional effect and which are recorded on a film strip having a center-to-center picture or image frame separation greater than the interocular distance selected for the placement of the lenses of the viewer.

Figure 1:
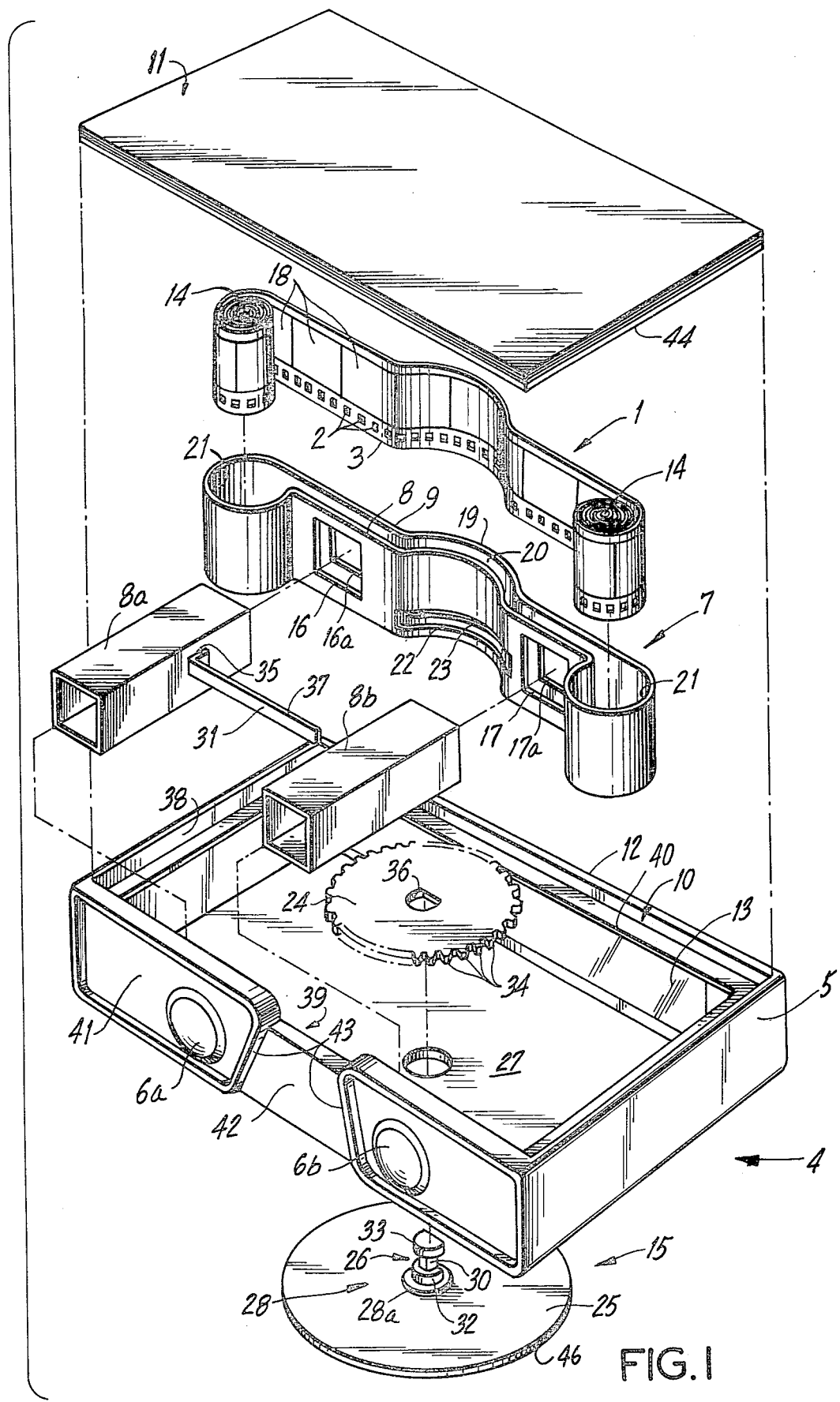
FIG. 1 is an exploded view of a stereoscopic viewer and attached booklet according to the present invention.
Figure 2:
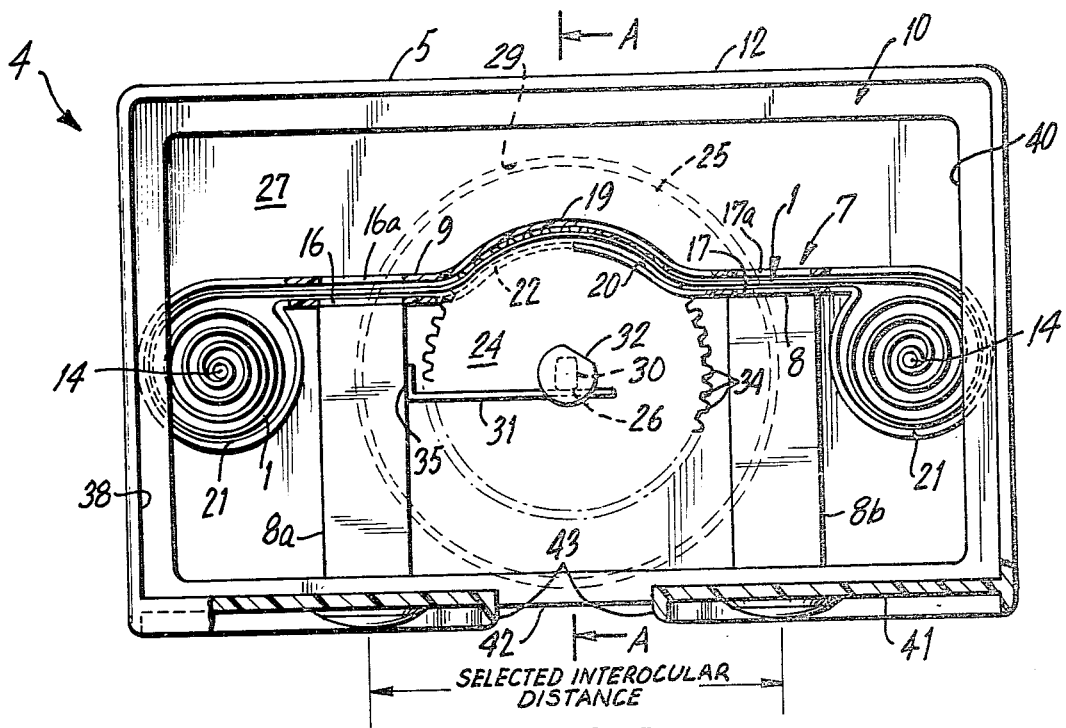
FIG. 2 is a top plan view, partly cutaway, of a stereoscopic viewer having an arcuate film guide channel and booklet nest according to an embodiment of the present invention.

Referring now to FIGS. 1 and 2, a stereoscopic viewer 4 is shown which basically comprises a box-like case 5, two eyepiece lenses 6a, 6b, a film guide channel 7, lens tubes 8a, 8b, a film drive mechanism 15 and a nest or alcove 10 dimensioned to accommodate a booklet 11 therein. The viewer 4 is lightweight and dimensioned to be easily carried in a pocket or handbag of the operator. The constituent parts of the viewer 4 can be constructed of any suitable materials such as plastic, glass, metal, cardboard or from various resins including acrylic or vinyl resins.

The back wall 12 of the viewer 4 has a window 13 formed by a translucent or opaque shield, and through which diffused light can enter to illuminate the film frames.

A film guide channel 7 is provided between front 8 and rear 9 guide walls to enable the photographic film 1 to be interposed therein. The film 1 can be inserted edgeways into the guide channel 7 either during assembly or threaded through the device after assembly. The ends of the film 1 may have an abutment means 14 to prevent the film 1 from being disengaged from the film drive mechanism 15.

Each guide wall 8, 9 contains viewing windows 16, 17, 16a, 17a, respectively, which are dimensioned to accommodate registration with the picture frames 18 and have a center-to-center planar separation approximately equal to a preselected interocular distance of an average operator of the viewer 4.

As previously noted, a film guide channel 7 is provided between the guide walls, 8, 9. Each guide wall 8, 9 contains an intermediate arch 19 which combine to form an arcuate film take-up passageway 20. The arcuate passageway 20 is predetermined, either empirically or by calculation, to have a radius of curvature to effect a longitudinal shortening of the film 1 in the plane of the windows 16, 17 and 16a, 17a. Thus, the length of the guide channel 7 between the windows, 16, 16a, to 17, 17a, is selected to substantially equal the separation or spacing between the paired stereoscopic picture frames. In this manner, each pair of stereoscopically recorded frames 2L-2R, 3L-3R . . . , which are recorded at a center-to-center separation greater than the selected interocular distance, are brought into registration with the windows 16, 16a and 17, 17a. Film storage cavities 21 are affixed to each end of the film guide walls 8, 9.

Sprocket wheel openings 22, 23 are provided at the base of each film guide wall 8, 9, respectively, to accommodate insertion of the sprocket wheel 24 therein.

The film drive mechanism 15 comprises a thumbwheel 25, a sprocket wheel 24, a detent 26 and the film archway or arcuate passageway 20.

The thumbwheel 25 includes a crown like portion on the outside of the case 5 and a shaft or axle 28 which extends through the bottom wall 27. The thumbwheel 25 is rotatably mounted within a recess portion 29 of the bottom wall 27. The shaft 28 includes: intermediate flat sections 30 on the inside of the case 5 which cooperate with a cantilevered spring blade 31 to provide a multi-ple position rotary detent 26 to hold the film 1 in a stationary viewing position; a key-way (sprocket wheel) drive portion 32; and a retaining ledge 33. The shaft 28 may also include an enlarged base or washer like portion 28a to enable superjacent positioning of the sprocket wheel 24 therewith.

The sprocket wheel 24 is predetermined to have a circumference whose radius of curvature is approximately equal to that of the archway 20. The sprocket wheel 24 contains a plurality of teeth 34, which partially extend into the opening 23 in the rear guide wall 9 beyond the film guide channel 7 to insure engagement with the sprocket holes 2 of the film 1. The sprocket wheel 24 and the archway 20 are configured to cooperatively form an arcuate film drive track to provide simultaneous meshing or engagement of a plurality of sprocket teeth 34 each with a film sprocket hole 2, along the archway 20. The sprocket teeth 34 are contoured to enhance smooth engagement with the sprocket holes 2. It can be appreciated that this feature of the preferred embodiment of the invention is provided to protect or guard against possible damage to the sprocket holes 2 and/or to virtually eliminate film 1 binding or slippage in the guide channel 7. The sprocket wheel 24 is rotatably driven, either clockwise or counterclockwise, to advance or rewind the film 1 through the guide channel 7, by actuation of a manually rotatable thumbwheel 25.

The detent function is obtained by the cantilevered spring blade 31 being biased into engagement with the flat portions 30 of the shaft 28. The cantilevered spring blade 31 can be mounted 35 to a structural member, e.g., a lens tube 8a, of the viewer in any conventional manner such as by use of a clamp, adhesive or rivet, and projects therefrom to exert not only a radial contact pressure against the flat portions 30 of the shaft 28, but also cooperates with the retaining ledge 33 to restrict or substantially eliminate axial travel of the sprocket wheel 24 and thumbwheel 25. The flat portions 30 may be configured to provide several tactile detent positions to facilitate film frame 1L-1R . . . registration with the lenses 6a, 6b.

With the shaft 28 inserted into the case 5 and through a key-way hub opening 36 in the sprocket wheel 24, an edge 37 of the cantilevered spring blade 31 abuts against the retaining ledge 33 to hold the sprocket wheel 24 and thumbwheel 25 in an interlocked relationship. In this manner, a dual function detent and mounting assembly device is provided.

The nest 10 contains a retaining ridge 38 having an opening 39 therein and a peripheral mounting ledge 40. The opening 39 is provided to enable easy access to and selection of the pages of the booklet 11 by the operator of the viewer 4. The ledge 40 functions as a support platform for the booklet 11. The height of the retaining ridge 38 is predetermined to provide a nest depth which is at least equal to the thickness of the booklet 11.

The two eyepiece lenses 6a, 6b are mounted on the forward wall 41 of the viewer 4 and have a center-to-center separation approximately equal to the interocular or inter-pupil distance.

Two substantially parallel hollow lens tubes 8a, 8b, optically couple or permit, in a conduit like manner, the light entering through the translucent window 13 to strike the two eyepiece lenses 6a, 6b respectively. The length of the lens tubes 8a, 8b and, therefore, the placement of the constituent parts of the viewer 4, for example, the guide walls 8 and 9, are determined by the focal length of the lenses 6a, 6b.

The forward wall 41 of the case 5 may define a recessed nose portion 42, such as a V or concave configuration, between the two lenses 6a, 6b to accommodate the nose of the operator. The walls 43 of the nose portion 42 extend smoothly downwardly and outwardly to enhance comfortable viewing.

With the booklet 11 inserted into the nest 10, the viewer-booklet combination form a flat-shaped and pocket-sized portable device for easy handling and protection of the booklet 11.

The booklet 11 contains information relative to the stereoscopic pictures. The back (cardboard or paper) cover 44 of the booklet 11 can be adhesively affixed to the platform to form a top cover member of the viewer 4 and to also function as a film retainer-guard over the film guide channel 7.

The film strip 1 winds and unwinds, under the influence of the driving mechanism 15, into and out of the tubular film cavities 21. The cavities 21 are configured and affixed to the guide walls 8, 9 without the viewing area, to facilitate and urge the film 1 to wind therein and unwind therefrom with sprocket wheel 24 rotation.

Figure 3:
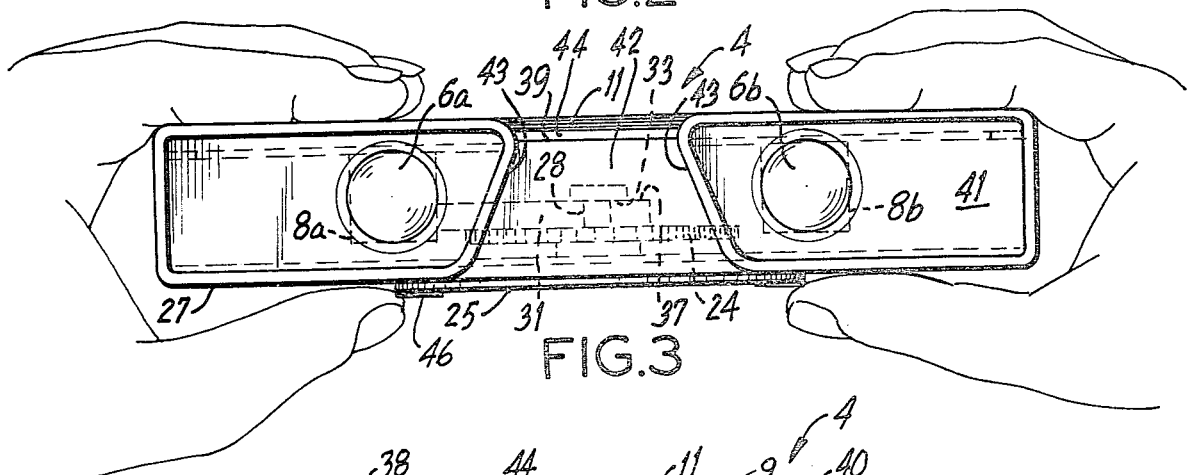
FIG. 3 is a front view of a stereoscopic viewer having a centrally disposed and protruding thumbwheel according to an embodiment of the present invention.
Figure 4:
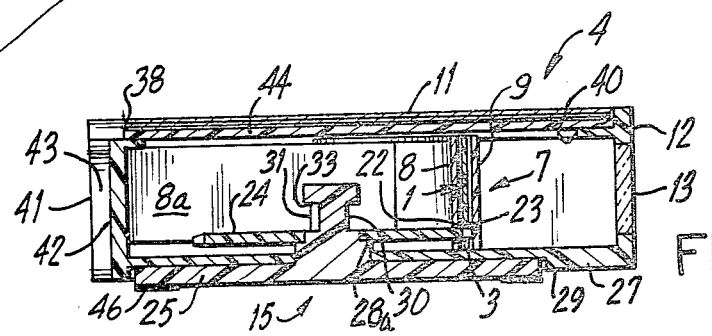
FIG. 4 is a cross sectional view taken through an assembled viewer of this type shown in FIG. 2 along the line A—A.

As may be seen from FIGS. 3 and 4, the crown portion of the thumbwheel 25 is centrally disposed and rotatably mounted within an indentation or recess 29 of the bottom wall 27. The crown portion is dimensioned to enable rotation thereof by the thumbs of an average operator of the viewer 4 while holding said viewer 4 with either or both hands. The bottom surface 46 of the thumbwheel 25 is, for example, embossed to provide improved frictional engagement with the thumb(s).

In the operation of the device as illustrated in FIG. 3, the operator of the stereoscopic viewer-booklet device manually rotates the thumbwheel 25 against the spring bias of the cantilevered spring blade 31 to align the desired stereoscopic pictures with the lenses 6a, 6b. The viewer 4 can be held in proximity to the face of the operator to enable viewing of a selected stereogram. The attached booklet 11 can be referenced to obtain information relevant to each stereoscopic picture-scene. In this manner, the stereoscopic viewer-booklet device can be utilized as a picture-booklet travelogue and/or as an educational device. For example, the stereoscopic pictures can depict suggested sightseeing items/places such as the Eiffel Tower while the booklet provides relevant and interesting information pertaining thereto. The viewer-booklet device can also be used as an educational device, for example, to teach or present subjects which require conceptualizing of spatial and/or intermingled relationships such as mechanical engineering and automotive repair. In this manner, the interrelationships of objects or parts can be depicted to give a three-dimensional and spatial effect when viewed through the stereoscope while detailed tolerances, etc., can be provided in the attached booklet.

While the invention has been described with respect to a preferred embodiment, it should be apparent to those skilled in the art that numerous modifications may be made thereto without departing from the spirit and scope of the invention. For example, a gear train drive may be interposed between the thumbwheel and the sprocket wheel to effect multiple sprocket wheel revolution with each revolution of the thumbwheel. Another alternative would be to utilize a thumbwheel dimensioned and/or positioned to enable easy actuation from the periphery or side(s) of the viewer.

I claim:

1. A hand held stereoscopic viewer, the combination comprising:
    a film strip having at least one stereoscopic image thereon composed of a pair of recorded frames having a predetermined separation therebetween;
    a booklet having information pertaining to said stereoscopic image;
    a housing having a nest portion for receiving said booklet therein so as to position a portion of the booklet to serve as booklet top cover means for effecting a film retainer-guard covering to said film guide channel means and to enable carriage of information pertaining to said stereoscopic image;
    a pair of lenses mounted on said housing and having a separation therebetween less than the separation between said pair of frames;
    a pair of parallel spaced lens tubes each having a first aperture aligned with a lens of said pair of lenses and extending within said housing a length approximately equal to the focal length of the lenses;
    film guide channel means within said housing having two viewing openings each aligned with a second aperture of each of said lens tubes for guiding said pair of frames past said openings and thereby into the field of view of the lenses;
    film take-up means between said viewing openings for drawing in film to effect simultaneous registration of said pair of frames each with a viewing opening with said film strip being guided past said viewing openings; and
    film drive means to engage and advance the film strip having a rotatably mounted disk on the outside of said housing manually actuatable for driving said film strip to locate said pair of frames in registration with the viewing openings.

2. A hand held stereoscopic viewer as in claim 1, wherein:
    the stereoscopically recorded image comprises a pair of picture frames recorded on the film strip with a longitudinal center-to-center separation greater than a predetermined interocular distance; and
    the pair of lenses are disposed to have a center-to-center separation approximately equal to the interocular distance.

3. A hand held stereoscopic viewer as in claim 1, wherein:
    the film take-up means comprises an arcuate film passageway for effecting a film guide channel length between said viewing openings substantially equal to the separation between said pair of frames;
    the film strip has perforations along an edge thereof; and
    the film drive means has a sprocket wheel containing a plurality of teeth and is configured to cooperate with said arcuate film passageway for effecting a curved film drive track wherein a plurality of said teeth each engage a perforation to drive said film strip.

4. A hand held stereoscopic viewer as in claim 3, wherein:
    the disk is rotatably mounted on a bottom wall of said housing and configured for being manually actuated by either thumb of an operator of the hand held viewer.

5. A hand held stereoscopic viewer as in claim 4, wherein:
    the film drive means has a detent to effect a plurality of rotational detent positions and the disk has a shaft movably mounted in an opening in the bottom wall and engages said sprocket wheel for effecting rotation of said sprocket wheel.

6. In combination:

a film strip having a plurality of stereoscopically recorded pictures thereon;

a stereoscopic viewer for viewing said stereoscopically recorded pictures comprising a housing having a nest with a peripheral ledge means and a retaining ridge having an opening therein to enable an operator finger access into said nest, a pair of lenses mounted on said housing and having a center-to-center separation substantially equal to a predetermined interocular distance, a film guide channel mounted within said housing for guiding the film strip past the field of view of said lenses, a film registration means for bringing the stereoscopically recorded pictures each into the field of view of a respective lens of said lenses for effecting a three dimensional image, and a film drive means to engage and advance the film strip to locate the stereoscopically recorded pictures in registration with the lenses; and a booklet means disposed within said nest and mounted on the ledge to form a cover wall means of said housing and for containing printed information pertaining to said stereoscopically recorded pictures, said booklet means being accessable at least through said opening to enable the operator to selectively turn to a page of the booklet means.

7. The combination as set forth in claim 6, wherein:

the film strip comprises a strip of split 35 mm film having a plurality of stereoscopically recorded pictures thereon each composed of two frames having a center-to-center separation greater than the interocular distance.

8. The combination as set forth in claim 6, wherein:

the film registration means comprises a curved film passageway for effecting a film guide channel length between the field of view of said lenses approximately equal to the separation between each pair of frames composing the stereoscopically recorded pictures;

the film strip has a plurality of holes along an edge thereof; and the film drive means has a sprocket wheel having a plurality of teeth and is configured to mate with the curved film passageway whereby a plurality of teeth each meshing with a hole, and a thumb wheel rotatably mounted on a bottom wall of said housing and configured for being manually actuated by either thumb of an operator of the viewer to effect rotation of said sprocket wheel whereby the film strip is laterally driven past the field of view of the lenses.

9. The combination as set forth in claim 6, wherein:

the retaining ridge having a height predetermined to provide a nest depth at least equal to the thickness of the booklet means; and the booklet means having a plurality of sections each containing printed information associated with a stereoscopic picture.

10. In combination:

a split 35 mm film strip having a plurality of stereoscopically recorded pictures thereon having drive holes therein;

a stereoscopic viewer means for viewing said stereoscopically recorded pictures comprising: a housing; a pair of lenses; a pair of lens tubes; a film guide channel and a film drive mechanism; said housing having a front, back, bottom and two spaced side walls and a top booklet nest having a peripheral ledge and a retaining ridge having an opening, said bottom wall having a hole therein; said back wall having a window formed therein; said pair of lenses being mounted on said front wall to have a center-to-center separation substantially equal to a predetermined interocular distance which is less than the center-to-center separation between paired frames composing each said stereoscopically recorded picture; said pair of lens tubes being disposed within said housing each being aligned with a lens of said pair of lenses and extending inwardly a length substantially equal to the focal length of the lenses; said film guide channel having at least two viewing openings with a center-to-center separation therebetween substantially equal to the interocular distance each being aligned with a lens tube whereby light entering through the window can pass through said viewing openings and the lens tubes to strike said lenses and an arcuate film passageway between said viewing openings having a length between said viewing openings substantially equal to the separation between each of said pair of frames, said film guide channel also having tubular film storage cavities affixed at both ends of said guide channel; said film drive mechanism has a sprocket wheel having a plurality of teeth and is configured to cooperate with the arcuate film passageway for effecting an arcuate film drive track whereby a plurality of said teeth each engage a drive hole to drive said film strip and a thumbwheel rotatably mounted on the outside of said bottom wall and being configured for being rotated by either and/or both thumbs of an operator of the viewer, said thumbwheel having a shaft extending into said housing through the hole in the bottom wall and rotatably engaging said sprocket wheel whereby said film strip can be driven to selectively locate a pair of frames in alignment with the viewing openings and thereby in the field of view of lenses; and booklet means being mounted on said ledge within said booklet nest for forming a top cover to said housing, said booklet means contains information corresponding to at least one of said stereoscopically recorded pictures.

11. In combination:

a film strip having a plurality of stereoscopic images thereon;

a portable stereoscopic viewer means for viewing said images and having a recessed portion; and booklet means mounted within said recessed portion of the stereoscopic viewer;

whereby information is provided in at least two complimenting media comprising stereograms and printed information having associative significance with at least one of said images.

12. The combination as set forth in claim 11, wherein:

the recessed portion comprises a ledge for mounting the booklet means thereon and a retaining ridge having a height predetermined to provide a depth of said recessed portion at least equal to a predetermined booklet thickness, the retaining ridge having an opening therein to enable an operator of said stereoscopic viewer access to enable selection of a page of said booklet means;

the booklet means has a plurality of pages containing printed information having relevance to and/or descriptive of said images;

the stereoscopic viewer has a film strip guide channel means for guiding the stereoscopic images into the field of view of a pair of viewing lenses; and the film strip has recorded thereon information referencing predetermined pages and/or sections of said booklet means containing printed information corresponding to said images, whereby the operator of said stereoscopic viewer is provided with the location in said booklet means to find information relevant to the image being viewed.

13. The combination as set forth in claim 12, wherein:

the booklet means is mounted on said ledge for forming a top cover to said stereoscopic viewer and a film strip retainer-guard covering to said film strip guide channel means.

14. The combination as set forth in claim 11, wherein:

the stereoscopic images and printed information are associated for presentation with three dimensional perspective of interrelationships of objects and said printed information being explanatory of the objects and/or their interrelationships.

* * * * *